United States Patent
Goyal et al.

(10) Patent No.: US 12,462,239 B2
(45) Date of Patent: Nov. 4, 2025

(54) SYSTEMS AND METHODS FOR CONDUCTING TRANSACTIONS USING HYBRID CREDIT/CHARGE FINANCIAL INSTRUMENTS

(71) Applicant: JPMORGAN CHASE BANK, N.A., New York, NY (US)

(72) Inventors: Rasik Goyal, New York, NY (US); Mike Janesch, New York, NY (US); Jeff Hofmann, New York, NY (US); Ryan Bouchard, Kennett Square, PA (US); Megan Chandler, New York, NY (US); Josh Berger, New York, NY (US); Steven Scarpato, New York, NY (US); Linda Barnett, New York, NY (US); Haritha Ravilla, New York, NY (US); Santosh Bejjamshety, New York, NY (US)

(73) Assignee: JCMORGAN CHASE BANK, N.A., New York, NY (US)

(*) Notice: Subject to any disclaimer, the term of this patent is extended or adjusted under 35 U.S.C. 154(b) by 216 days.

(21) Appl. No.: 17/808,444

(22) Filed: Jun. 23, 2022

(65) Prior Publication Data
US 2022/0414633 A1    Dec. 29, 2022

Related U.S. Application Data
(60) Provisional application No. 63/214,722, filed on Jun. 24, 2021.

(51) Int. Cl.
*G06Q 30/00*    (2023.01)
*G06Q 20/24*    (2012.01)

(52) U.S. Cl.
CPC .................. *G06Q 20/24* (2013.01)

(58) Field of Classification Search
CPC ........................................ G06Q 20/24
(Continued)

(56) References Cited

U.S. PATENT DOCUMENTS

| 8,078,528 B1* | 12/2011 | Vicente | G06Q 40/02 705/38 |
|---|---|---|---|
| 2010/0023390 A1* | 1/2010 | Kim | G06Q 20/10 235/487 |

(Continued)

OTHER PUBLICATIONS

ProQuestDialogNPL Search History.*
Ip.com NPL Search History.*

*Primary Examiner* — John H. Holly
(74) *Attorney, Agent, or Firm* — GREENBERG TRAURIG LLP (57) ABSTRACT

Systems and methods for conducting transactions using hybrid credit/charge financial instruments are disclosed. A method may include a transaction processing computer program: establishing a hybrid account comprising a pay-in-full portion and a revolving balance portion, the pay-in-full portion having a pay-in-full portion limit, and the revolving balance portion having a revolving balance portion limit; receiving a transaction for a transaction amount involving the hybrid account from a point of transaction device; applying rule(s) to the transaction to identify a pay-in-full amount of the transaction amount for the pay-in-full portion and/or a revolving balance amount of the transaction amount for the revolving balance portion; debiting the pay-in-full portion for pay-in-full amount and/or the revolving balance portion for the revolving balance amount; monitoring the pay-in-full portion and the revolving balance portion for balances and payments; and adjusting the pay-in-full portion limit and/or the revolving balance portion limit based on the monitoring.

20 Claims, 3 Drawing Sheets

(58) Field of Classification Search
USPC ......... 705/39, 1.1, 44, 41, 40, 64, 14.17, 34; 235/380, 487
See application file for complete search history.

(56) References Cited

U.S. PATENT DOCUMENTS

2019/0073669 A1* 3/2019 Dutta ..................... G06Q 20/40
2021/0406896 A1* 12/2021 Chaturvedi .......... G06Q 20/405

* cited by examiner

SYSTEMS AND METHODS FOR CONDUCTING TRANSACTIONS USING HYBRID CREDIT/CHARGE FINANCIAL INSTRUMENTS

RELATED APPLICATIONS

This application claims priority to, and the benefit of, U.S. Provisional Patent Application Ser. No. 63/214,722, filed Jun. 24, 2021, the disclosure of which is hereby incorporated, by reference, in its entirety.

BACKGROUND OF THE INVENTION

1. Field of the Invention

Embodiments generally relate to systems and methods for conducting transactions using hybrid credit/charge financial instruments.

2. Description of the Related Art

Individuals and organizations may conduct transactions from debit accounts (e.g., demand deposit accounts, or DDAs) using checks or debit cards, or from lines of credit using credit cards. This arrangement limits the total line of credit available to the individuals or organizations.

SUMMARY OF THE INVENTION

Systems and methods for conducting transactions using hybrid credit/charge financial instruments are disclosed. According to one embodiment, a method for conducting transactions using hybrid credit/charge financial instruments may include: (1) establishing, by a transaction processing computer program executed by an electronic device, a hybrid account comprising a pay-in-full portion and a revolving balance portion, the pay-in-full portion having a pay-in-full portion limit, and the revolving balance portion having a revolving balance portion limit; (2) receiving, by the transaction processing computer program, a transaction for a transaction amount involving the hybrid account from a point of transaction device; (3) applying, by the transaction processing computer program, one or more rules to the transaction to identify a pay-in-full amount of the transaction amount for the pay-in-full portion and/or a revolving balance amount of the transaction amount for the revolving balance portion; (4) debiting, by the transaction processing computer program, the pay-in-full portion for pay-in-full amount and/or the revolving balance portion for the revolving balance amount; (5) monitoring, by the transaction processing computer program, the pay-in-full portion and the revolving balance portion for balances and payments; and (6) adjusting, by the transaction processing computer program, the pay-in-full portion limit and/or the revolving balance portion limit based on the monitoring.

In one embodiment, the pay-in-full portion may be associated with a demand deposit account.

In one embodiment, the pay-in-full portion may include a separate partition within the revolving balance portion.

In one embodiment, the revolving balance portion may include a credit account.

In one embodiment, the revolving balance portion may be set as a percentage of an overall line for the hybrid account.

In one embodiment, the one or more rules comprise a transaction amount, a Merchant Classification Code (MCC), and/or a product type.

In one embodiment, the revolving balance portion limit may be decreased in response to a balance being carried by the revolving balance portion.

According to another embodiment, a system may include a financial institution electronic device executing a transaction processing computer program; a rules database; and a merchant point of transaction device. The transaction processing computer program may establish a hybrid account for a customer comprising a pay-in-full portion and a revolving balance portion, the pay-in-full portion having a pay-in-full portion limit, and the revolving balance portion having a revolving balance portion limit, may receive a transaction for a transaction amount involving the hybrid account from the merchant point of transaction device, may retrieve one or more rules from the rules database and applies the one or more rules to the transaction to identify a pay-in-full amount of the transaction amount for the pay-in-full portion and/or a revolving balance amount of the transaction amount for the revolving balance portion; may debit the pay-in-full portion for pay-in-full amount and/or the revolving balance portion for the revolving balance amount, may monitor the pay-in-full portion and the revolving balance portion for balances and payments, may adjust the pay-in-full portion limit and/or the revolving balance portion limit based on the monitoring.

In one embodiment, the pay-in-full portion may be associated with a demand deposit account.

In one embodiment, the pay-in-full portion may include a separate partition within the revolving balance portion.

In one embodiment, the revolving balance portion may include a credit account.

In one embodiment, the revolving balance portion may be set as a percentage of an overall line for the hybrid account.

In one embodiment, the one or more rules comprise a transaction amount, a Merchant Classification Code (MCC), and/or a product type.

According to another embodiment, a non-transitory computer readable storage medium, including instructions stored thereon, which when read and executed by one or more computer processors, cause the one or more computer processors to perform steps including: establish a hybrid account comprising a pay-in-full portion and a revolving balance portion, the pay-in-full portion having a pay-in-full portion limit, and the revolving balance portion having a revolving balance portion limit; receive a transaction for a transaction amount involving the hybrid account from a point of transaction device; apply one or more rules to the transaction to identify a pay-in-full amount of the transaction amount for the pay-in-full portion and/or a revolving balance amount of the transaction amount for the revolving balance portion, wherein one or more rules comprises a transaction amount, a Merchant Classification Code (MCC), and/or a product type; debit the pay-in-full portion for pay-in-full amount and/or the revolving balance portion for the revolving balance amount; monitor the pay-in-full portion and the revolving balance portion for balances and payments; and adjust the pay-in-full portion limit and/or the revolving balance portion limit based on the monitoring.

In one embodiment, the pay-in-full portion may be associated with a demand deposit account.

In one embodiment, the pay-in-full portion may include a separate partition within the revolving balance portion.

In one embodiment, the revolving balance portion may include a credit account.

In one embodiment, the revolving balance portion may be set as a percentage of an overall line for the hybrid account.

In one embodiment, the one or more rules comprise a transaction amount, a Merchant Classification Code (MCC), and/or a product type.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are directed to systems and methods for conducting transactions using hybrid credit/charge financial instruments or accounts. In embodiments, the hybrid charge/credit financial instrument or account may provide pay-in-full functionality and revolving credit functionality.

In embodiments, during account opening, the customer may be presented with specific disclosures that may emphasize the paid in full nature of the product and its implication on the APR, minimum payment and late fee. Additional disclosures, such as those for restrictions on trading for a different product (e.g., in case customer cannot afford higher minimum payment) may be provided.

The hybrid charge/credit financial instrument may have an overall credit line that includes both a pay-in-full line and a revolving balance line. The amount of each line may be fixed, set as a percentage, or may be based on customer and/or a macroeconomic situation. Factors that may be considered in setting each line may include customer account balances, customer spend history, customer payment history, customer assets, other account that the customer may have with the issuing financial institution, with other financial institutions, etc.

The overall credit limit assignment may be based on credit worthiness and spending needs of the customer or the business. Embodiments may assign a portion of the overall limit as a revolving balance limit. For example, the revolving line may initially be assigned as a certain percentage of the overall line. In embodiments, the revolving line may be based on true customer need (e.g., leveraging artificial intelligence models developed using customer data, spend behavior, payment rates across all financial products and customer's business revenue trends). The revolving line may also be proactively adjusted.

In one embodiment, a trained machine learning model may be used to assign the different lines to a customer. The trained machine-learning model may determine the lines based on prior lines for the customer, lines for other similarly situated customers, etc. The lines may be dynamically adjusted periodically or as otherwise necessary and/or desired.

The paid in full balance may provide a zero percent annual percentage rate (APR) for purchases and cash, and the customer may have the flexibility to use a portion of the overall line as a revolving balance line that may have its own terms/APR.

Transactions may be automated and classified based on the available revolving line and a qualification criterion. For example, purchases of an amount that is greater than a particular amount (e.g., $100, $500, or any desired amount) may be automatically classified for the revolving line long as that line is not maxed out.

In another embodiment, transactions may be classified automatically based on a merchant category code (MCC), product type, etc. Artificial intelligence and machine learning based on prior classifications for the customer and/or similarly situated customers, manually, etc. may also be used. For example, a machine learning model may be trained to identify the customer's classifications of prior transactions (e.g., amount, type of product, merchant, purchaser, etc.) and may predict a classification for a current transaction using the trained model.

In another embodiment, the customer may select the classification for a purchase, and may classify a purchase before a transaction, at the time of the transaction, or after the transaction has posted. The customer may further change a classification for a transaction as desired. The customer may classify a transaction using a mobile application provided by the issuing financial institution.

Customers are expected to pay the minimum payment on the revolving portion balance and the pay-in-full portion balance of the paid in full line by the payment due date to avoid late fees. The revolving balance portion credit line APR may be subject to penalty pricing due to missed payments.

In embodiments, an account summary may provide pay-in-full line and revolving balance portion line APRs, limits, balances and available limit separated for each line. The account summary may separately identify the minimum payments for the paid in full line and the revolving line separately. In embodiments, the information may be provided in online, servicing, and voice channels.

Figure 1:
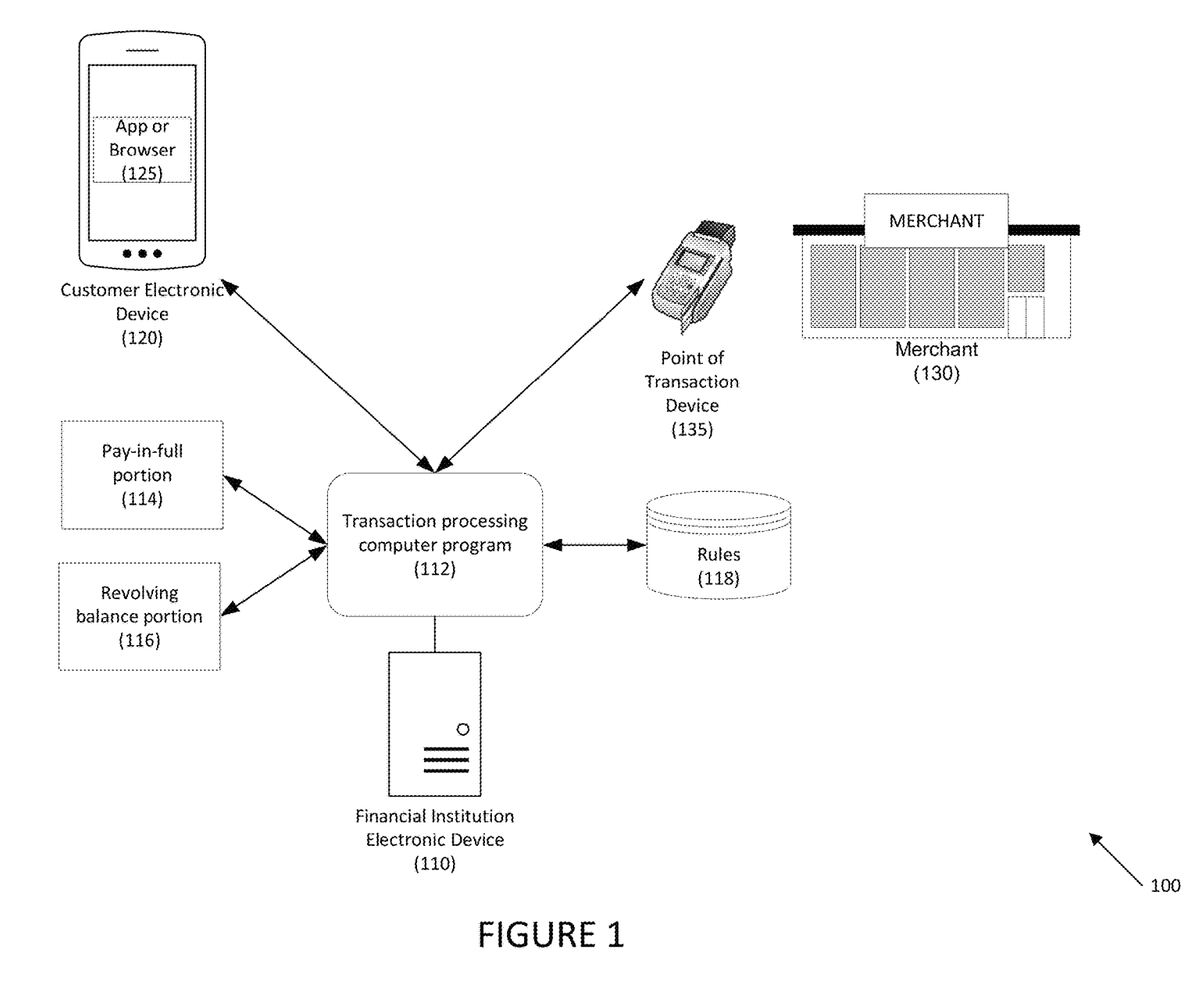
FIG. 1 depicts a system for conducting transactions using hybrid credit/charge financial instruments according to an embodiment.

Referring to FIG. 1, a system for conducting transactions using hybrid credit/charge financial instruments is disclosed according to an embodiment. System 100 may include financial institution electronic device 110 which may be a server (e.g., physical and/or cloud based) or any other suitable backend electronic device. Financial institution electronic device 110 may execute transaction processing computer program 112 that may receive transactions from merchant point of transaction device 135 for merchant 130. Merchant 130 may be a physical or online merchant, and point of transaction device 135 may be a physical device (e.g., a point-of-sale device) or an online interface.

Transaction processing computer program 112 may further interface with rules database 118, which may maintain rules that may be applied to incoming transactions to identify the portion of a hybrid account for the transaction, or the amount for each portion. For example, rules 118 may specify criteria for a transaction to be paid using pay-in-full portion 114 or revolving balance portion 116. If both accounts are used, rules 118 may specify the amounts to be applied to each of the portion.

Pay-in-full portion 114 may be a demand deposit account (DDA), a savings account, etc. When a transaction is identified for pay-in-full portion 114, the amount is deducted promptly. In one embodiment, pay-in-full portion 114 may be a separate partition within a customer credit card account. When a transaction is identified for pay-in-full portion 114, the amount is due in full at next statement cycle.

Revolving balance portion 116 may be a credit-based account.

In one embodiment, rules 118 may be based on a transaction amount (e.g., transactions over $100, $500, or any desired amount may be automatically classified for the revolving line long as that line is not maxed out. Rules may also classify transactions based on a merchant category code (MCC), product type, etc.

In one embodiment, rules 118 may be set using a trained machine learning model based on the customer's classifications of prior transactions (e.g., amount, type of product, merchant, purchaser, etc.).

In another embodiment, the customer may specify rules 118 manually, for example, using application or browser 125 executed by customer electronic device 120. Customer electronic device 120 may be any suitable electronic device, including computers (e.g., workstation, desktop, notebook, laptop, tablet, smart phone, Internet of Things (IoT) appliances, etc.).

In one embodiment, the customer may also set the rules using a kiosk (not shown), such as an automated teller machine or similar.

Figure 2:
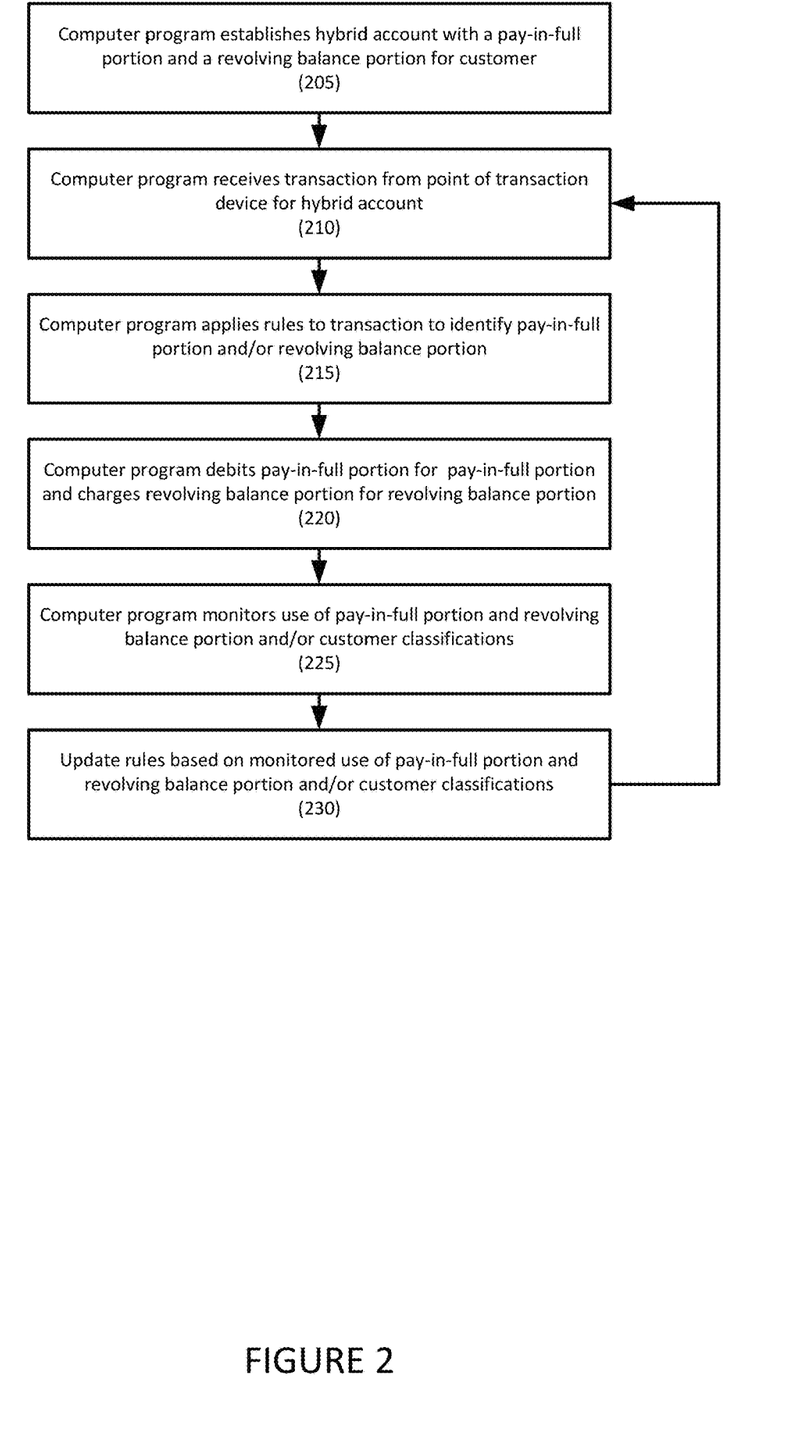
FIG. 2 depicts a method for conducting transactions using hybrid credit/charge financial instruments according to an embodiment.

Referring to FIG. 2, a method for conducting transactions using hybrid credit/charge financial instruments is disclosed according to an embodiment.

In step 205, a transaction processing computer program executed by a financial institution electronic device may establish a hybrid account for a customer. The hybrid account may have a pay-in-full portion and a revolving balance portion. The computer program may set limits for each portion based on the customer's credit worthiness and spending needs. The revolving balance portion may be set as a percentage of the overall line for the account. In embodiments, the revolving balance may be based on true customer need (e.g., leveraging artificial intelligence models developed using customer data, spend behavior, payment rates across all financial products and customer's business revenue trends).

Factors that may be considered in setting each line may include customer account balances, customer spend history, customer payment history, customer assets, other account that the customer may have with the issuing financial institution, with other financial institutions, etc.

In step 210, once the hybrid account is established, the transaction processing computer program may receive a transaction involving the hybrid account from a point of transaction device. The point of transaction device may be a physical point of sale device, a website, etc.

In one embodiment, the customer may present a physical card for the account, may enter an account identifier, etc.

In step 215, the transaction processing computer program may apply rules to the transaction to identify the pay-in-full portion and/or the revolving balance portion of the transaction. For example, the rules may be based on a transaction amount, a MCC classification, a product type, etc. In one embodiment, the transaction amount may be split and a first portion may be paid by the pay-in-full portion, and a second portion may be paid by the revolving balance portion.

In step 220, the transaction processing computer program may debit the pay-in-full portion for pay-in-full portion, and may charge the revolving balance portion for revolving balance portion.

In step 225, the transaction processing computer program may monitor the pay-in-full portion and revolving balance portion for usage, balances, payments, etc. For example, the transaction processing computer program may identify how long it takes for a customer to pay off a revolving balance portion charge. If the transaction is routinely paid promptly, the revolving balance portion limit may be increased. If, however, the customer carries a balance for a period of time, the revolving balance portion limit may be decreased.

In addition, the transaction processing computer program may adjust the transaction amount threshold for routing the transaction to the revolving balance account. For example, if the revolving balance account is promptly paid, the threshold may be adjusted upward.

In another embodiment, the transaction processing computer program may monitor any manual classifications of transactions by the customer, such as the customer classifying transactions with certain merchants, for certain products, for certain amounts, at certain days of the week, times of the month, months of the year, etc.

In step 230, the transaction processing computer program may update the rules based on monitored use of pay-in-full account and revolving balance account and/or the customer manual classifications.

The process may then repeat.

Figure 3:
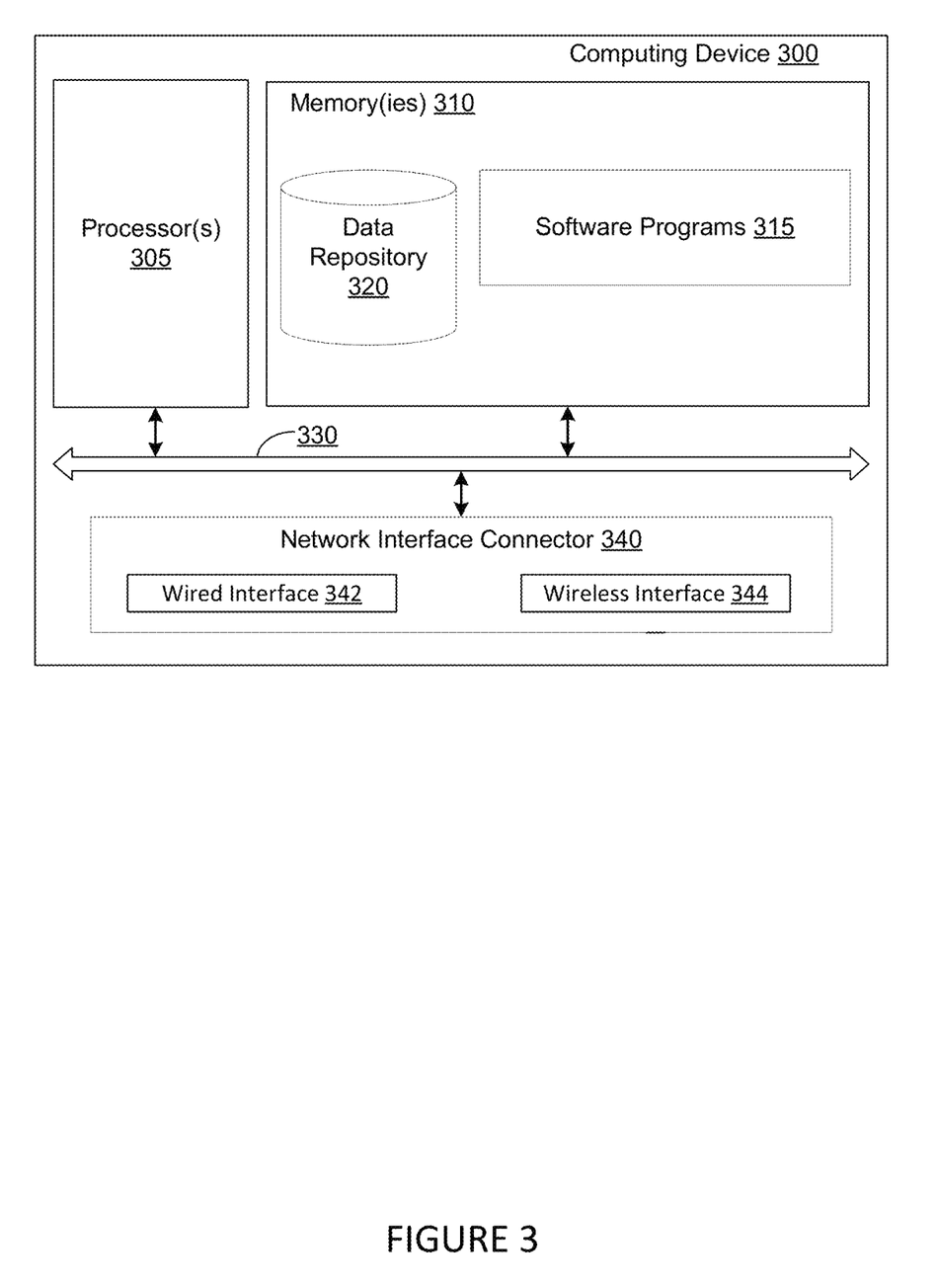
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Although multiple embodiments have been described, it should be recognized that these embodiments are not exclusive to each other, and that features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for conducting transactions using hybrid credit/charge financial instruments, comprising:
    establishing, by a transaction processing computer program executed by an electronic device, a hybrid account comprising a pay-in-full portion and a revolving balance portion, the pay-in-full portion having a pay-in-full portion limit, and the revolving balance portion having a revolving balance portion limit;
    receiving, by the transaction processing computer program and from a merchant point of transaction device, a transaction for a transaction amount from a customer involving the hybrid account from a point of transaction device;
    determining, by a first machine learning engine of the transaction, a revolving balance amount of the transaction amount for the revolving balance portion based on customer data of the customer, spend behavior of the customer, payment rates of the customer, and business revenue trends of the customer;
    applying, by a second machine learning engine of the transaction processing computer program, one or more rules to the transaction, the one or more rules being identified based on a classification to identify a pay-in-full amount of the transaction amount for the pay-in-full portion and the revolving balance amount of the transaction amount for the revolving balance portion, the classification being predicted by the machine learning engine based on a comparison customer similar to the customer and a prior classification based on an amount, a type of product, a merchant, and a purchaser;
    debiting, by the transaction processing computer program, the pay-in-full portion for pay-in-full amount and the revolving balance portion for the revolving balance amount;
    monitoring, by the transaction processing computer program, the pay-in-full portion and the revolving balance portion for balances and payments; and
    adjusting, by the transaction processing computer program, the pay-in-full portion limit and the revolving balance portion limit based on the monitoring.

2. The method of claim 1, wherein the pay-in-full portion is associated with a demand deposit account.

3. The method of claim 1, wherein the pay-in-full portion comprises a separate partition within the revolving balance portion.

4. The method of claim 1, wherein the revolving balance portion comprises a credit account.

5. The method of claim 1, wherein the revolving balance portion is set as a percentage of an overall line for the hybrid account.

6. The method of claim 1, wherein the one or more rules comprise a transaction amount, a Merchant Classification Code (MCC), and a product type.

7. The method of claim 1, wherein the revolving balance portion limit is decreased in response to a balance being carried by the revolving balance portion.

8. A system, comprising:
    a financial institution electronic device executing a transaction processing computer program;
    a rules database; and
    a merchant point of transaction device;
    wherein:
    the transaction processing computer program establishes a hybrid account for a customer comprising a pay-in-full portion and a revolving balance portion, the pay-in-full portion having a pay-in-full portion limit, and the revolving balance portion having a revolving balance portion limit;
    the transaction processing computer program receives a transaction from the merchant point of transaction device for a transaction amount from a customer involving the hybrid account from the merchant point of transaction device;
    the transaction processing computer program including a first machine learning engine of the transaction that determines a revolving balance amount of the transaction amount for the revolving balance portion based on customer data of the customer, spend behavior of the customer, payment rates of the customer, and business revenue trends of the customer;
    the transaction processing computer program including a second machine learning engine that identifies one or more rules from the rules database based on the one or more rules based on a classification to identify a pay-in-full amount of the transaction amount for the pay-in-full portion and the revolving balance amount of the transaction amount for the revolving balance portion, the classification being predicted by the machine learning engine based on a comparison customer similar to the customer and a prior classification based on an amount, a type of product, a merchant, and a purchaser;

the transaction processing computer program debits the pay-in-full portion for pay-in-full amount and the revolving balance portion for the revolving balance amount;

the transaction processing computer program monitors the pay-in-full portion and the revolving balance portion for balances and payments; and the transaction processing computer program adjusts the pay-in-full portion limit and the revolving balance portion limit based on the monitoring.

9. The system of claim 8, wherein the pay-in-full portion is associated with a demand deposit account.

10. The system of claim 8, wherein the pay-in-full portion comprises a separate partition within the revolving balance portion.

11. The system of claim 8, wherein the revolving balance portion comprises a credit account.

12. The system of claim 8, wherein the revolving balance portion is set as a percentage of an overall line for the hybrid account.

13. The system of claim 8, wherein the one or more rules comprise a transaction amount, a Merchant Classification Code (MCC), and a product type.

14. The system of claim 8, wherein the revolving balance portion limit is decreased in response to a balance being carried by the revolving balance portion.

15. A non-transitory computer readable storage medium, including instructions stored thereon, which when read and executed by one or more computer processors, cause the one or more computer processors to perform steps comprising:

establish a hybrid account comprising a pay-in-full portion and a revolving balance portion, the pay-in-full portion having a pay-in-full portion limit, and the revolving balance portion having a revolving balance portion limit;

receive a transaction from a merchant point of transaction device for a transaction amount from a customer involving the hybrid account from a point of transaction device;

determine, by a first machine learning engine of the transaction, a revolving balance amount of the transaction amount for the revolving balance portion based on customer data of the customer, spend behavior of the customer, payment rates of the customer, and business revenue trends of the customer;

apply one or more rules to the transaction, the one or more rules being identified by a second machine learning engine based on the one or more rules based on a classification to identify a pay-in-full amount of the transaction amount for the pay-in-full portion and the revolving balance amount of the transaction amount for the revolving balance portion, the classification being predicted by the machine learning engine based on a comparison customer similar to the customer and a prior classification based on an amount, a type of product, a merchant, and a purchaser;

debit the pay-in-full portion for pay-in-full amount and the revolving balance portion for the revolving balance amount;

monitor the pay-in-full portion and the revolving balance portion for balances and payments; and adjust the pay-in-full portion limit and the revolving balance portion limit based on the monitoring.

16. The non-transitory computer readable storage medium of claim 15, wherein the pay-in-full portion is associated with a demand deposit account.

17. The non-transitory computer readable storage medium of claim 15, wherein the pay-in-full portion comprises a separate partition within the revolving balance portion.

18. The non-transitory computer readable storage medium of claim 15, wherein the revolving balance portion comprises a credit account.

19. The non-transitory computer readable storage medium of claim 15, wherein the revolving balance portion is set as a percentage of an overall line for the hybrid account.

20. The non-transitory computer readable storage medium of claim 15, wherein the revolving balance portion limit is decreased in response to a balance being carried by the revolving balance portion.

\* \* \* \* \*